United States Patent [19]
Gibbons

[11] 3,743,312
[45] July 3, 1973

[54] COMBINED WHEEL BARROW AND HAND TRUCK
[75] Inventor: Gregory J. Gibbons, Hopewell Junction, N.Y.
[73] Assignee: The Raymond Lee Organization, Inc., New York, N.Y.
[22] Filed: June 25, 1971
[21] Appl. No.: 156,787

[52] U.S. Cl............................ 280/47.18, 280/47.27
[51] Int. Cl.......................................... B62b 1/20
[58] Field of Search................... 280/47.18, 47.27, 280/47.31, 47.26, 47.2, 39

[56] References Cited
UNITED STATES PATENTS
1,243,432  10/1917  Lemke............................ 280/47.18
1,095,145  4/1914   Elterich......................... 280/47.2 X
1,475,785  11/1923  Bergstrom........................ 280/47.18
1,572,531  2/1926   Henkel........................... 280/47.26

FOREIGN PATENTS OR APPLICATIONS
1,046,104  7/1953  France............................ 280/47.31

Primary Examiner—Leo Friaglia
Assistant Examiner—John A. Pekar
Attorney—Richard S. Shreve, Jr.

[57] ABSTRACT

A hand truck can be converted to a wheel barrow by detachably securing a tub thereto and by swinging axles carrying wheels into rest positions adjacent the tub.

1 Claim, 5 Drawing Figures

PATENTED JUL 3 1973 3,743,312
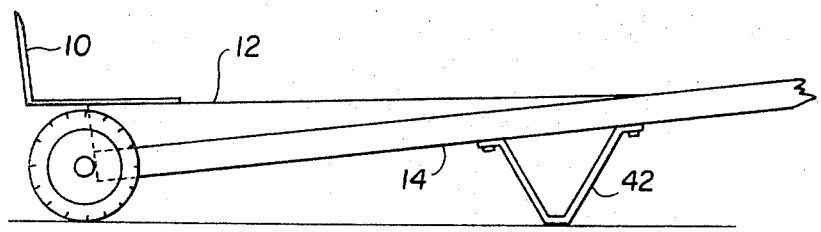
FIG.1
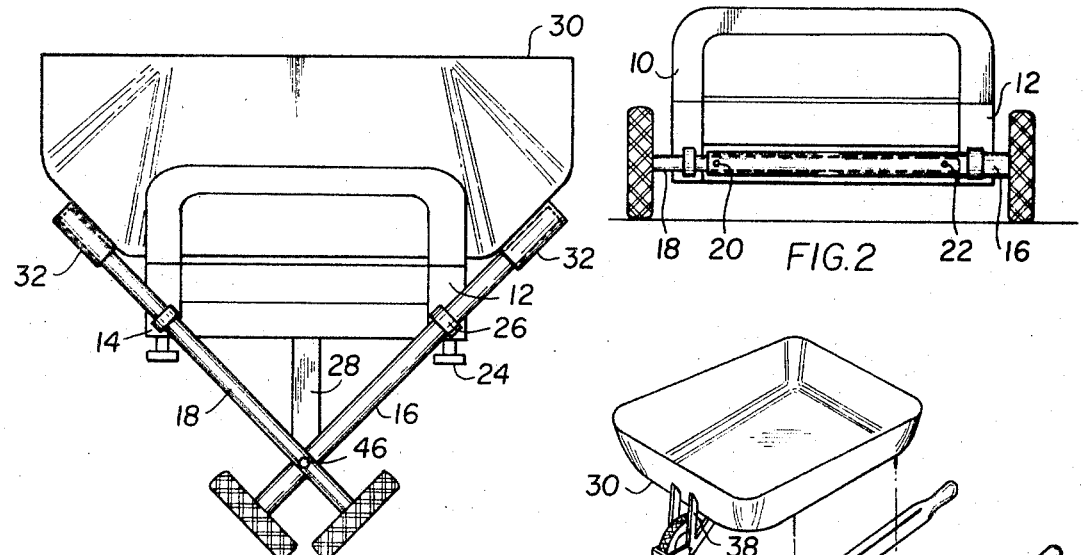
FIG.2
FIG.3
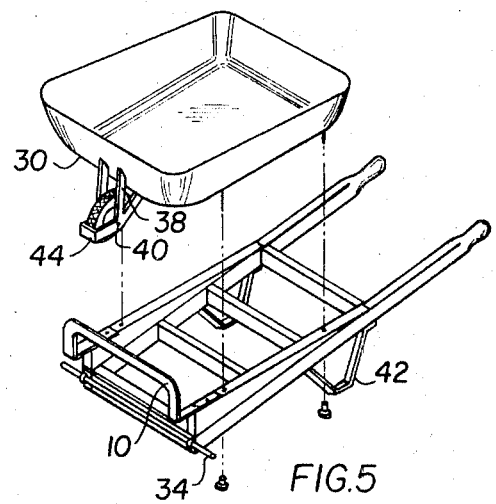
FIG.5
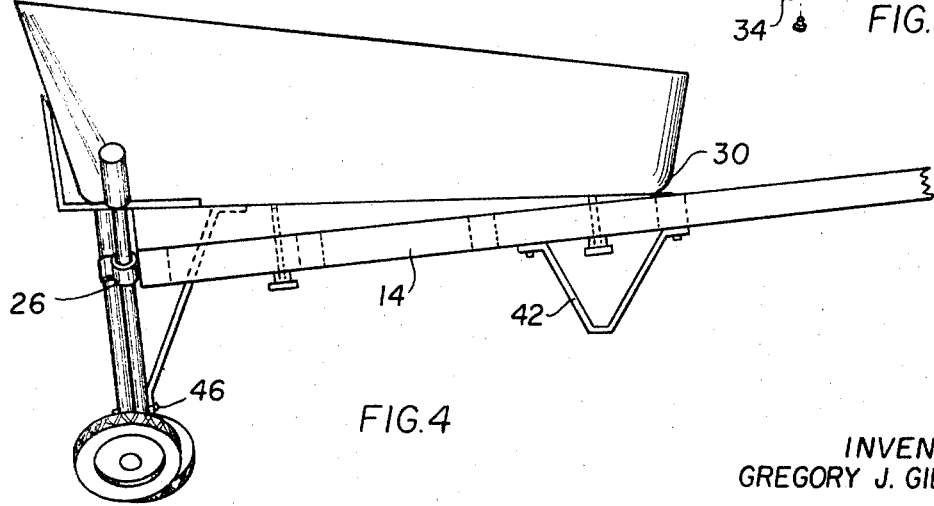
FIG.4
INVENTOR
GREGORY J. GIBBONS

COMBINED WHEEL BARROW AND HAND TRUCK

SUMMARY OF THE INVENTION

Almost every home owner buys a wheel barrow. Frequently, the owner has the need for a hand truck to move furniture or heavy objects. My invention, which I call the "Wheel All," can be used either as a hand truck or as a wheel barrow by carrying out a few conversion steps. My invention takes the form of a hand truck with a wheel barrow tub detachably securable thereto. The tub can carry its own wheel secured forwardly thereto and the truck wheels can be secured to axles of different diameter, the smaller axle fitting within the larger which is hollow when the hand truck use is required. In one form of my invention, both axles with wheels attached can be swung out of the way and are detachably secured in rest positions adjacent the tub when wheel barrow use is required. In another form of my invention, the two axles are always used and are never out of the way.

BRIEF DESCRIPTION OF THE DRAWINGS

In the drawings:

FIG. 1 is a side view of one form of my invention as used as a hand truck;

FIG. 2 is an end view of the structure of FIG. 1;

FIG. 3 is an opposite end view of the structure of FIG. 4;

FIG. 4 is a side view of the same form of my invention as used as a wheel barrow; and FIG. 5 is a perspective view of a second form of my invention.

DETAILED DESCRIPTION OF PREFERRED EMBODIMENTS

Referring now to the drawings, the following parts have the following numbers:

load ramp 10
wedge 12
runner 14
axle 16
axle 18
pin 20
pin 22
wing nuts 24
fastener 26
brace 28
tub 30
sockets 32
axle 34
brace assembly part 36
brace assembly part 38
axle 40
stops 42
dumper bumper 44
pin 46

Referring now to FIGS. 1–5, axle 18 is smaller and fits inside axle 16 past pin 22. Pins 20 and 22 hold these axles together. Wedge 12 elevates lead ramp 10 above the wheels. At the end of each chassis runner 14 is a fastener 26 (for example a pipe tee) for the axles. This tee rotates 360° to swing the axles into position for the wheel barrow. Tub 30 has welded bolts passing through the chassis and wedge with wing nuts 24 for locking. Brace 28, welded to the bottom of the tub goes between the cross beams of the chassis and is pinned by pin 46 to the axles for support to the wheels.

After conversion, axles 16 and 18 can be supported in sockets 32. As shown in FIG. 2, these axles can become one piece.

Axle 34 is of the second design (FIG. 5) is one piece and stays secured at all times. The brace assembly, formed by parts 36 and 38, for the wheel on the wheelbarrow can be welded to the tub. Axle 40 is short and remains with the wheelbarrow assembly. As shown at 44, a dump bumper can be provided for easy unloading.

While I have described my invention with particular reference to the drawings, such is not to be considered as limiting its actual scope.

Having thus described this invention, what is asserted as new is:

1. In combination;
    a hand truck;
    a detachable wheel barrow tub secured to said truck to convert the same to a wheel barrow;
    said truck having two oppositely disposed wheels secured to corresponding axles; and
    means for pivotally and slidably mounting the two axles on the truck;
    means for detachably securing said axles in crossed configuration for wheelbarrow usage;
    one of said axles being hollow and receiving the other axle therein when truck usage is employed.

* * * * *